United States Patent [19]

Lee

[11] Patent Number: 4,907,548

[45] Date of Patent: Mar. 13, 1990

[54] PINION GEAR ASSEMBLY FOR TRANSLATING RECIPROCATING MOVEMENTS OF THE PISTONS IN THE CYLINDERS OF AN INTERNAL COMBUSTION ENGINE INTO THE ROTATING MOVEMENT OF A SHAFT

[76] Inventor: Sangchin Lee, Bessarabienstrasse 4, D-7140 Ludwigsburg, Fed. Rep. of Germany

[21] Appl. No.: 168,479

[22] Filed: Mar. 15, 1988

[30] Foreign Application Priority Data

Mar. 25, 1987 [DE] Fed. Rep. of Germany ....... 3709790

[51] Int. Cl.[4] ........................ F02B 75/32; G01B 09/08

[52] U.S. Cl. ........................... 123/56 AC; 123/56 BC; 123/197 C; 192/41 S

[58] Field of Search ........... 123/56 AC, 56 R, 56 BC, 123/58 R, 59 R, 197 R, 197 C, 46 SC; 192/415, 45

[56] References Cited

U.S. PATENT DOCUMENTS

| | | | |
|---|---|---|---|
| 1,671,796 | 5/1928 | Tracey | 123/46 SC |
| 2,337,330 | 12/1943 | Julin | 123/197 AC |
| 2,482,136 | 9/1949 | Wright | 123/197 C |
| 3,868,932 | 3/1975 | Toth | 123/197 R |
| 4,433,649 | 2/1984 | Shin | 123/197 C |
| 4,735,299 | 4/1988 | Ohuchi | 192/45 |
| 4,782,796 | 11/1988 | Braun | 123/46 SC |

FOREIGN PATENT DOCUMENTS

| | | | |
|---|---|---|---|
| 1084271 | 6/1960 | Fed. Rep. of Germany | 123/197 C |
| 3531862 | 3/1987 | Fed. Rep. of Germany | 123/197 R |
| 492530 | 7/1919 | France | 123/197 C |

*Primary Examiner*—David A. Okonsky

*Attorney, Agent, or Firm*—Jones, Tullar & Cooper

[57] ABSTRACT

A pinion gear assembly for translating the back and forth movement of the pistons in the cylinders of an internal combustion engine into the rotating movement of a shaft is described. Two pistons are each disposed in pairs and opposite each other with the ends of a gear rack and perform back and forth movements together with the gear rack. Two gear wheels are in engagement with the gear rack and are disposed on two further shafts and are coupled with these by means of a grip roller and expanding friction clutch each. In the one direction of movement of the gear rack the one gear wheel drives the associated shaft and in the other direction of movement the other gear wheel drives the associated shaft in a respective direction of rotation. The drive directions of rotation of the two further shafts are in the same direction. During rotation of the gear wheels in a respective drive direction of rotation opposite to the direction of rotation they continue to freewheel in the drive direction of rotation. The further shafts drive the first mentioned shaft.

2 Claims, 7 Drawing Sheets

PINION GEAR ASSEMBLY FOR TRANSLATING RECIPROCATING MOVEMENTS OF THE PISTONS IN THE CYLINDERS OF AN INTERNAL COMBUSTION ENGINE INTO THE ROTATING MOVEMENT OF A SHAFT

FIELD OF THE INVENTION

The invention relates to a pinion gear assembly for the back and forth movements of the pistons in the cylinders of an internal combustion engine into the rotating movement of a shaft.

BACKGROUND OF THE INVENTION

The translation of the back and forth, or reciprocating, movements of the pistons of an internal combustion engine into a rotating movement is normally accomplished by a crank gear comprising a crank-shaft and connecting rods. In this arrangement there is the disadvantage that with an increase in rpm and compression, strongly increased friction losses occur in the bearings of the connecting rods, the crank and the crank shaft. Particularly in connection with Diesel engines this limits an increase in compression and rpm, although higher compression ratios would be per se desirable because they would result in higher ignition temperatures and thereby improved combustion. This is desirable because of improvements in efficiency as well as reduction of pollutants in the exhaust gases.

SUMMARY OF THE INVENTION

Accordingly, it is an object of the present invention to provide a gear assembly of the previously mentioned type wherein the translation of the back and forth movements of the piston into a rotating movement of a shaft can take place with reduced frictional losses and in a simplified manner. The frictional conditions should be such that the frictional losses caused by rpm and/or compression do not increase as much as is the case in the known devices. On the contrary, the frictional losses should remain constant, something which could not be achieved thus far.

This object is attained by the invention in that two pistons which are located in pairs opposite each other are connected with the ends of a gear rack and perform the back and forth movement together with the gear rack, in that two gear wheels engage the gear rack and are seated on two further shafts and are each coupled with it by means of a grip roller and expanding friction clutch in such a way that in the one direction of movement of the gear rack the one gear wheel drives the associated shaft and in the other direction of movement the other gear wheel drives the associated shaft in the respective drive direction, the drive directions of rotation of the two further shafts being in the same direction, and in that these shaft continue to free-wheel in the drive direction of rotation when the gear wheels rotate in a direction opposite the drive direction f rotation, and in that the further shafts drive the first mentioned shaft.

Thus, by means of the invention the back and forth movements of the piston are translated into a rotational movement in a simple manner because two pistons are disposed on opposite ends of a gear rack and the one-piece unit consisting of pistons and the gear rack moves back and forth in a straight line. Two shafts are driven via gear wheels, one during movement of the gear rack in one direction and the other during its movement in the other direction. The respective, not driven shaft "freewheels", which is made possible by means of a grip roller and expanding friction clutch between gear wheel and shafts which permits drive of the shaft by the gear wheel in the one direction of rotation (drive direction of rotation) and, in the other direction of rotation, permits free rotation of the shaft in a direction opposite to the direction of rotation of the gear wheel.

An advantageous improvement of the invention provides that the grip roller and expanding friction clutches may be designed in a manner known per se such that on the respective shaft a grip roller bearing wheel fixedly connected with it is disposed and has a plurality of recesses around its circumference, the distance of the bottom surface of the recesses from the inside surface of the gear wheel diminishing in the drive direction of rotation and a grip roller being disposed in each recess, which is pressed into the grip position by means of a spring.

The known grip roller and expanding friction clutches or free-wheeling grip rollers here employed are very simple components and can be used in the present case. However, other types of clutches, in particular of the electromagnetic type or the like could also be used. It is important in the coupling between shaft and gear wheel that in the one direction in which the gear wheel is driven by the gear rack because of expansion in the one piston, torque transfer to the shaft takes place, while the shaft can continue to rotate free during the succeeding slowing and reversing of movement of the gear wheel caused by its engagement with the gear rack.

A further advantageous improvement of the invention provides that an additional two gear wheels are in engagement with each gear rack which are also seated on the further shafts and are coupled with these by means of a grip roller and expanding friction clutch each in such a way that the shaft drives the gear wheel and the gear rack coupled with it in the drive direction of rotation and the gear wheel can free-wheel in the direction opposite the drive direction of rotation. These two gear wheels are used to transfer a torsional force from the shaft to the gear wheel during the compression phase so that the energy transferred to the shaft during the preceding expansion phase can be used for compression in the subsequent compression phase. These two gear wheels are also used during starting for bringing about compression in the cylinders.

For the purpose mentioned in the preceding paragraph it is advantageously provided that the grip roller and expanding friction clutches between the shafts and the further gear wheels are designed in a manner known per se in such a way that on the respective shaft a grip roller bearing wheel, fixedly connected with it, is disposed which has a plurality of recesses around its circumference, the distance of the bottom surface of the recesses from the inner surface of the gear wheel increasing in the drive direction of rotation, and a grip roller being provided in each recess and being kept in a gripping position by a spring, and with bars disposed on a disk force-locked by, for example, a permanent magnet with the grip roller bearing wheel, and being switchable by switching means disposed on the gear rack. This, too, consists of known elements of drive technology, in this case the arrangement being thus that seizing occurs when the shaft rotates faster than the gear wheel disposed on it and that when the direction of movement is reversed, free-wheeling of the shaft in regard to the gear wheel becomes possible.

A further advantageous improvement of the invention provides that the first mentioned gear wheels and the further gear wheels are each disposed on both sides of the gear racks which have teeth on both sides, and that the further shafts are together connected via a gear wheel drive with the first mentioned shaft which has a flywheel/drive wheel. In order to make as little noise as possible and to keep errors in the tooth formation small and, furthermore, in order to obtain a large degree of overlap, the gear wheels are designed with slanted teeth and are supported in particularly strong bearings to absorb radial and axial forces.

In this way the forces acting on both sides of the gear rack are compensated and a particularly stable arrangement and support are achieved. The drive wheel, i.e. the wheel through which the work generated by the internal combustion engine is transferred, is in the form of a flywheel, so that the flywheel can drive the shafts in the respective compression cycle and the shafts in turn can, in the manner described above, drive the gear rack.

Basically it is to be assumed in the invention that the two pistons move as one with the respective gear rack to the opposite ends of which they are fastened. This inevitably results in the space between cylinder and piston on one side of the gear rack becoming larger while the space between cylinder and piston on the other side of the gear rack becomes smaller. This arrangement is particularly practical for a two-stroke diesel engine in which the ignition/expansion cycle can take place on the one side and the exhaust/compression cycle on the other side. However, the invention can be used in the same way with four-cycle engines and gasoline engines. Since the pinion gear according to the invention is, among other things, characterized by the one-piece unit of gear rack with pistons attached to both its ends moving back and forth in a straight line, it may also be described as a "linear drive" or "straight drive", which is suitable or destined to replace the customary crankshaft drive in an internal combustion engine.

An exemplary embodiment of the invention and its advantageous improvements are described in detail below, reference being made to the attached drawings.

DETAILED DESCRIPTION OF THE PREFERRED EMBODIMENTS

Figure 1:
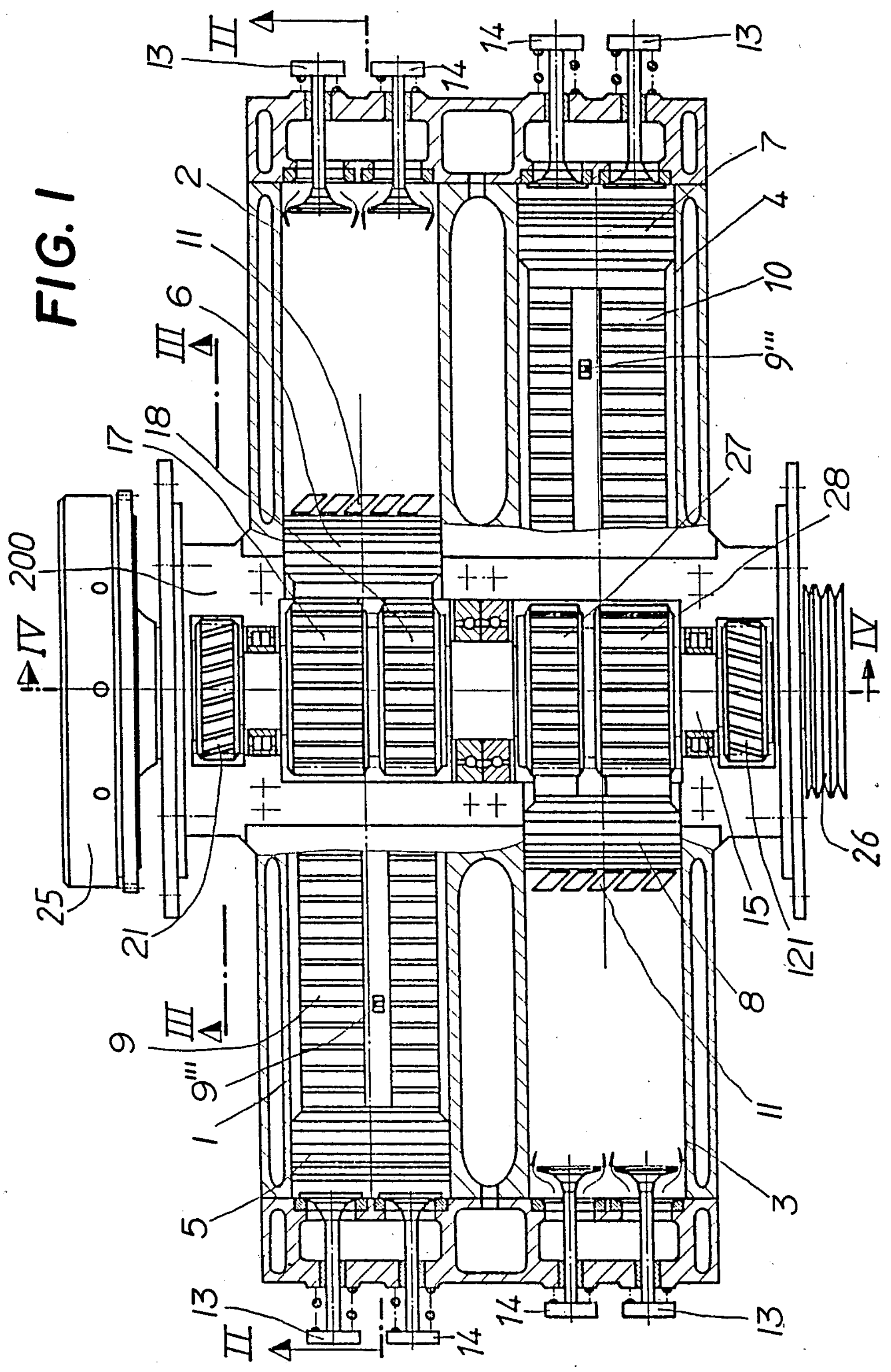
FIG. 1 is a schematic top view of an engine including the present invention.

FIG. 1 shows an internal combustion engine with four cylinders 1, 2, 3, 4, in which pistons 5, 6, 7, 8, are disposed to more movable back and forth. The cylinders 1 to 4 are part of a housing 200 provided with corresponding cooling chambers. Support rings 51, encompassing the shafts 24 and 124 with their bearings and rubber shock absorbers, are also part of the housing 200. The pistons 5 and 6 are fixedly disposed on the two opposite ends of a first gear rack 9; the pistons 7 and 8 are fixedly disposed on the two ends of a second gear rack 10. In FIG. 1 the pistons 5 and 7 are at top dead center, the pistons 6 and 8 at bottom dead center. Because the pistons 5, 6 or 7, 8 are fixedly connected with the gear racks 9, 10, they move as a unit, i.e. movement of the pistons 5 and 6 or 7 and 8 can always only take place in the same direction. FIG. 1 assumes a mode of operation of a two-cycle Diesel engine: if in the position shown in FIG. 1 the valves 13, 14 of the cylinders 1, 4 are closed, the air is compressed and fuel is injected via the injection nozzle 12, ignition takes place because of the high compression. The piston 5 or 7 moves inwards, i.e. piston 5 towards the right and piston 7 towards the left. The ignited fuel/air mixture expands. If then the outlet ports 11 are opened, the burned mixture (exhaust) flows out. If the inlet valves 13, 14 are opened, fresh air flows in, fills the cylinder 2 and, at the same time, flushes the remaining exhaust gases out through the outlet ports 11. The slides for opening or closing the outlet ports have not been shown for simplicity's sake. While the piston 6 is at bottom dead center, ignition of the fuel/air mixture takes place in the opposite cylinder 1. The piston 5 and the piston 6 then move towards the right. In cylinder 2 compression again takes place. Once the piston 6 has again reached the position indicated, the cycle begins again. In this manner it is obvious that the gear rack 9 is always alternately being pushed towards the left by piston 6 and towards the right by piston 5.

Figure 2:
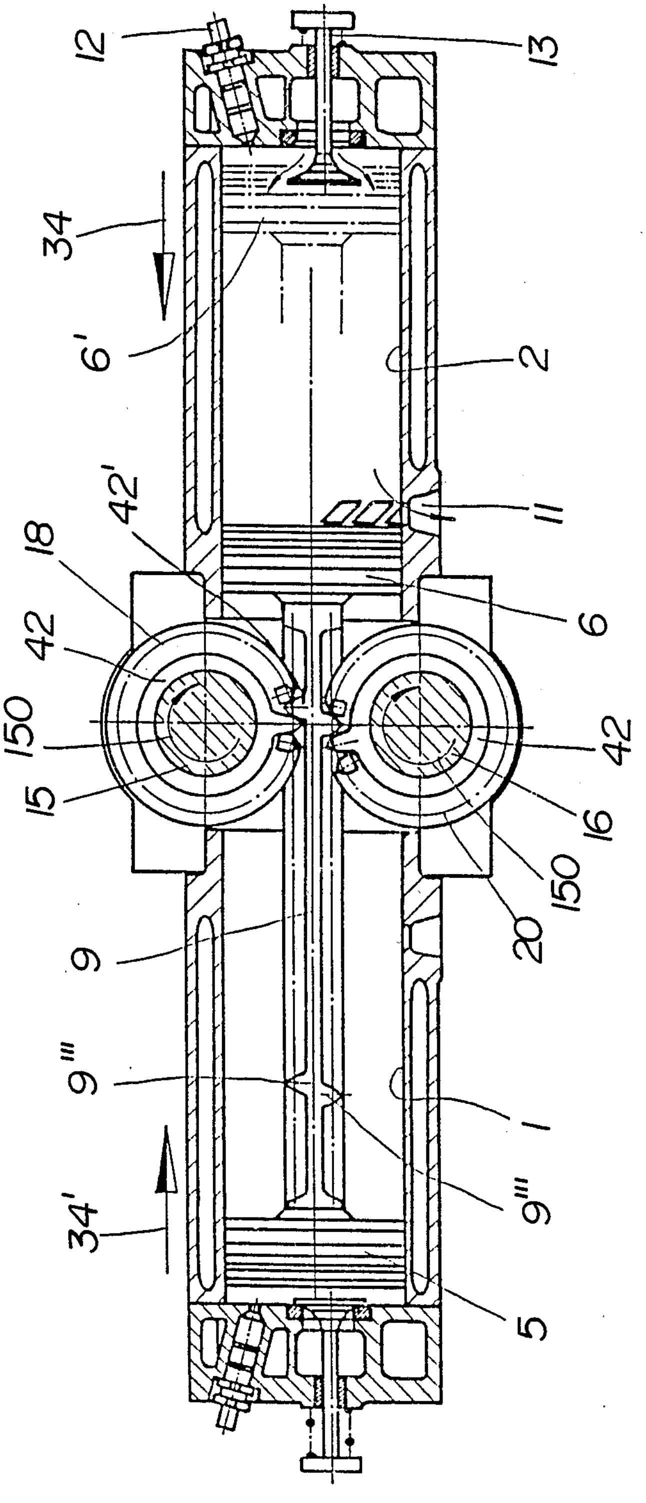
FIG. 2 is a section along the line II—II of FIG. 1.
Figure 3:
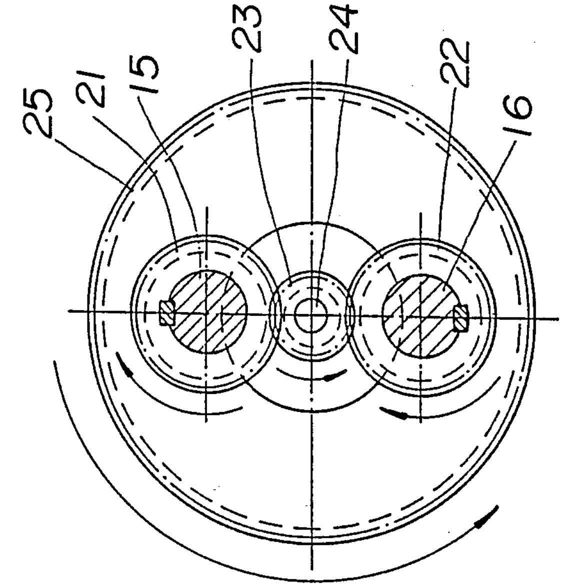
FIG. 3 is a section along the line III—III of FIG. 1.
Figure 4B:
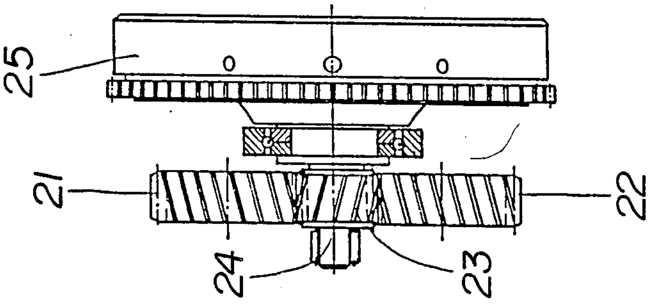
FIG. 4*b* is an excerpted view of the area IV*b* of FIG. 4.
Figure 4:
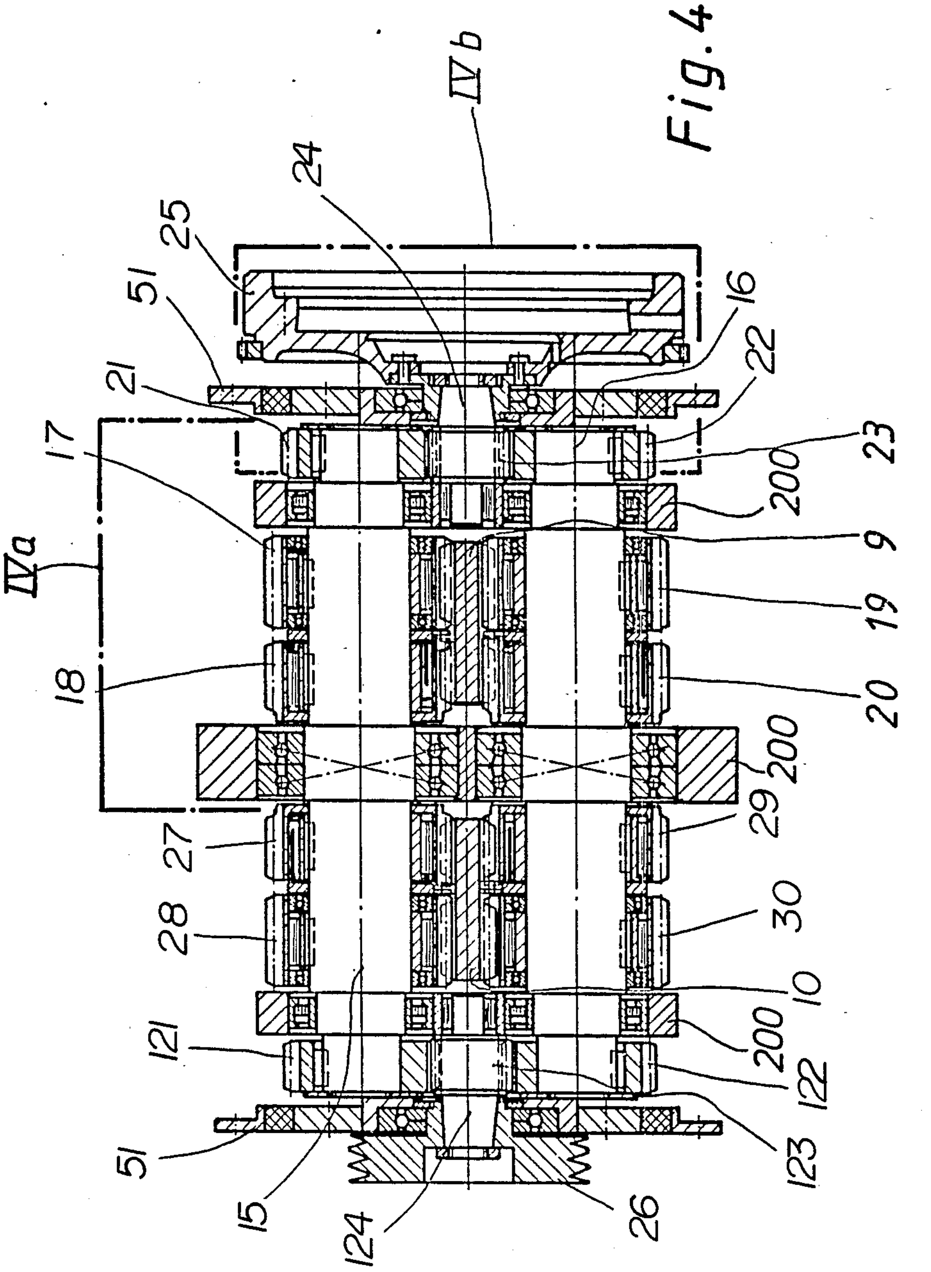
FIG. 4 is a section along the line IV-IV of FIG. 1.

In order to translate the back and forth movement of the gear racks 9 or 10 into a rotational movement, a shaft 15 is disposed above the gear rack 9 and a shaft 16 below the gear rack 9 (see FIG. 2). The gear rack 9 has a toothing 9' on op and 9'' on the bottom. In a tooth-free region at the ends (in a longitudinal direction) or the center (in a crosswise direction) switching cams 9''' are provided. Coupling of the gear rack 9 with the shaft 15 takes place via the gear wheels 17, 18; coupling of the shaft 16 with the gear rack 9 takes place via two gear wheels 19, 20. The manner of coupling of the gear wheels 17, 18 and 19, 20 with the gear rack 9 is shown in detail in FIGS. 5 and 6. It is accomplished such that the driving of the shafts 15, 16 always takes place only in one particular direction of rotation, the drive direction of rotation designated with the arrow 150. The drive direction of rotation of both shafts 15, 16 is the same. Thus they rotate in the same direction. The shaft 15 is furthermore connected with a gear wheel 21, the shaft 16 with a gear wheel 22. Both are in engagement with a further gear wheel 23 which is connected with the shaft 24. The shaft 24 is the actual drive shaft. It has a flywheel/drive wheel 25. At the opposite end (in FIG. 4) a corresponding shaft 124 is disposed which has a pulley 26 for driving the generator (starter, injection pump, etc. It is provided with a gear wheel 123 and is driven by gear wheels 121, 122, which are disposed on the shafts 15, 16.

In the same manner the coupling of the gear rack 10 with the shafts 15, 16, is accomplished by gear wheels 27, 28, disposed above it and by gear wheels 29, 30 disposed below it.

Figure 4A:
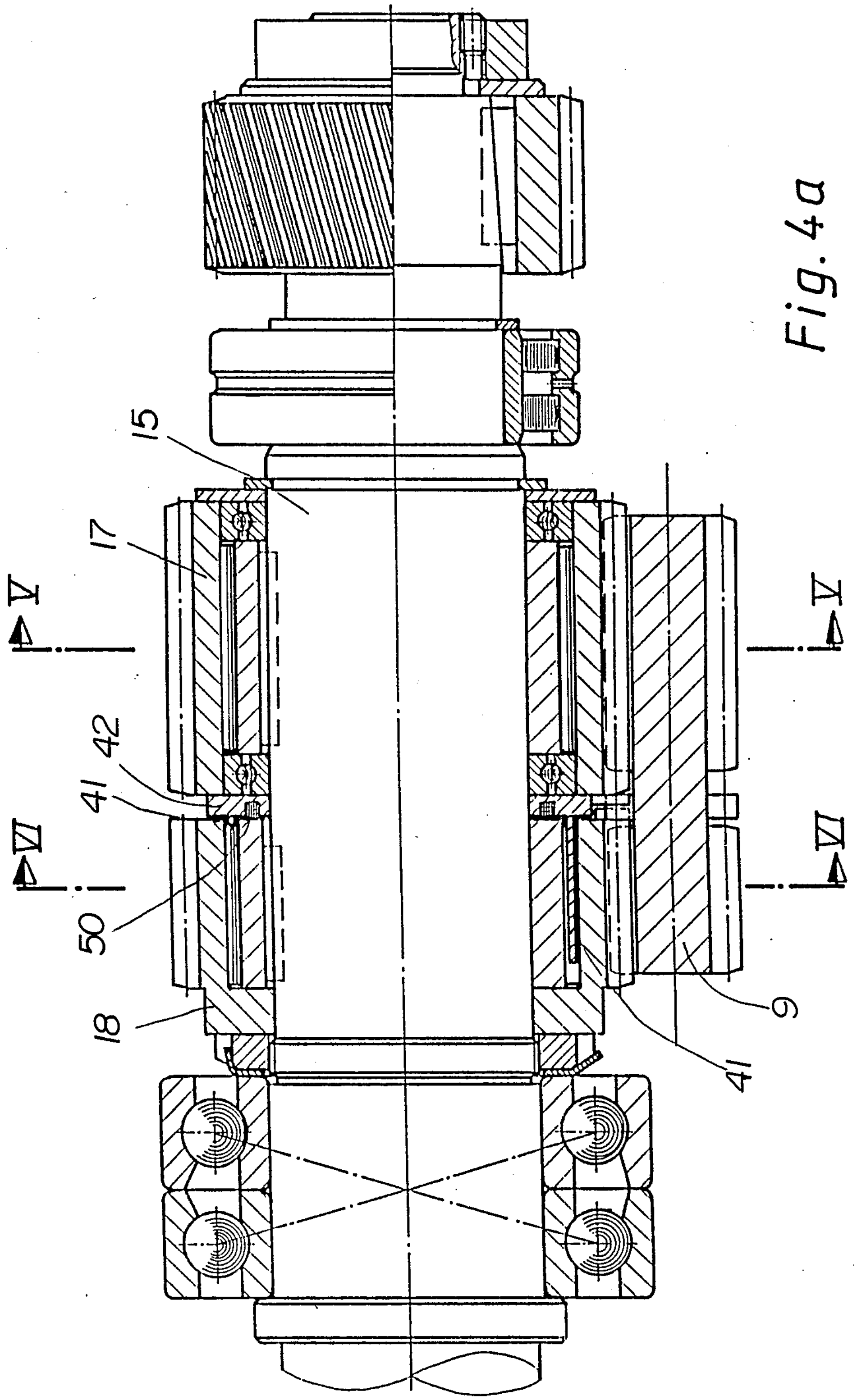
FIG. 4*a* is an enlarged view of the area IV*a* of FIG. 4.
Figure 5:
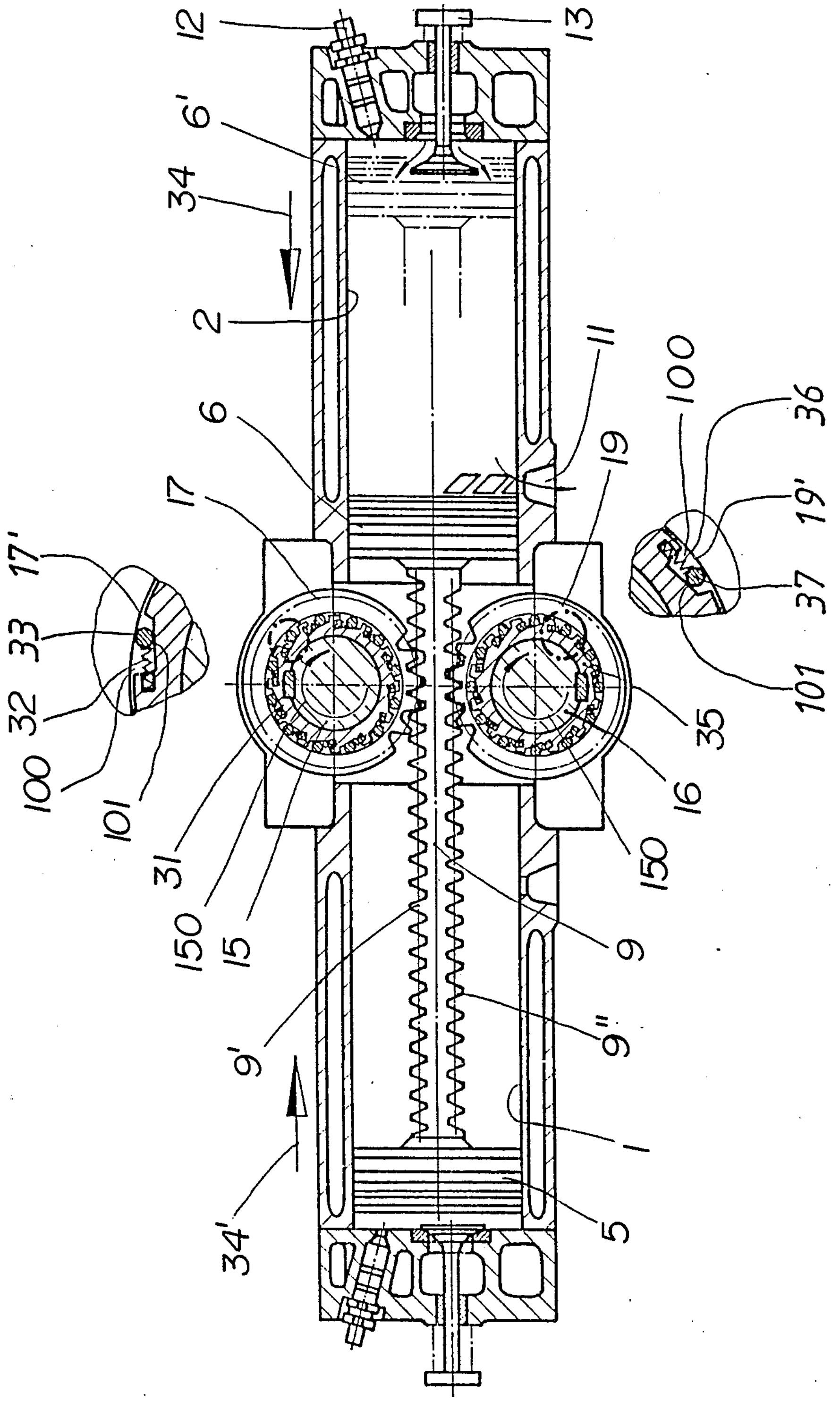
FIG. 5 is a section along the line V—V in FIG. 4*a*.

As shown in FIGS. 4*a* and 5, a grip roller and expanding friction clutch is disposed between the gear wheel 17 engaging the gear rack 9 and the shaft 15 formed by a grip roller bearing wheel 31 fastened by wedges to the shaft 15 and having recesses 100 with grip rollers 33 disposed therein and pressed into the grip position shown by means of springs 32. The bottom surfaces 101 of the recesses 100 are formed such that the distance to the cylindrical inner surface 17' of the gear wheel 17 (or 18' of 18) diminishes in the drive direction of rotation 150. In the position shown the diameter of the grip rollers 33 is greater than the smallest distance between the bottom surface 101 and the inner surface 17'. Thus, if the grip roller is pushed into this position, seizing occurs and thus a positive transfer of force from the gear wheel 17 to the shaft 15. If the gear rack 9 is driven during the expansion cycle by the piston 6 in the direction of the arrow 34 into the position 6' (see FIG. 6) and if the gear rack 9 thus rotates the gear wheel 17, as indicated, in the drive direction of rotation 150, the grip rollers 33 are pulled into the grip position shown, in addition to the force of the springs 32, by the frictional force of the inner surface 17' of the gear wheel 17. Positive transfer of force from the gear wheel 17 to the grip roller bearing wheel 31 and thus to the shaft 15 takes place, so that the linear movement of the gear rack 9 is positively translated into a rotational clockwise movement of the shaft 15. The gear wheel 17 thus drives the shaft 15, i.e. because of the embodiment of the grip roller and expanding friction clutch shown, a torque force is transferred from the gear wheel 17 to the shaft 15.

The gear wheel 19 is in engagement with the toothing 9" on the underside of the gear rack 9. The gear wheel 19 is also supported on the shaft 16 by means of a free-wheeling grip roller formed by the grip roller bearing wheel 35 and the rollers 37 pre-stressed by the springs 36. The grip roller bearing wheel 35 is fastened to the shaft 16 by wedging. During the phase described in the preceding paragraph (gear rack 9 or gear wheel 17 drive the shaft 15) the gear wheel 19, because of engagement with the gear rack 9, necessarily rotates opposite to the drive direction of rotation 150 of the shaft 16 which rotates in the same direction as the shaft 15 in order to be able to drive the shaft 24 together with it (see above). The inner surface 19' of the gear wheel 19 acts on the grip rollers 37 and moves them against the force of the springs 36 out of the wedging position, so that the gear wheel 19 free-wheels in respect and opposite to the shaft 16. This is of critical importance, because the shaft 16 rotates in the same direction as the shaft 15. The direction in which the shaft 16 rotates is also its drive direction of rotation 150, i.e. the direction of rotation in which it is driven when the grip rollers 37 are wedged when the gear rack 9 moves in the direction of the arrow 34'. However, this is only possible if, when the gear rack 9 moves in the direction 34', free rotation of the gear wheel 17 opposite to the rotation of the shaft 15 is possible.

If the movement of the gear rack 9 in the direction 34 slows because the piston 6 approaches bottom dead center (left in FIG. 5) and the compression force required when the piston 5 approaches top dead center increases, the shaft 15, because it is coupled with the flywheel/drive wheel 25, for its part is intended to drive, via the gear wheel 18, the gear rack 9 in the direction 34 and thus to give up a part of the energy it had previously absorbed and to do compression work. This is accomplished by the grip roller and expanding friction clutch on the one hand providing frictional connection between the gear wheel 18 and the shaft 15 and transferring torque from the shaft 15 to the gear wheel 18 and thus to the gear rack 9 and, on the other, the grip roller and expanding friction clutch being disengaged between the gear wheel 17 and the shaft 15. The latter is accomplished by the bottom surface 101 of the recess 100 not moving past, i.e. practically "passing", the grip roller 33 to such a degree that the wedging is removed.

Figure 6:
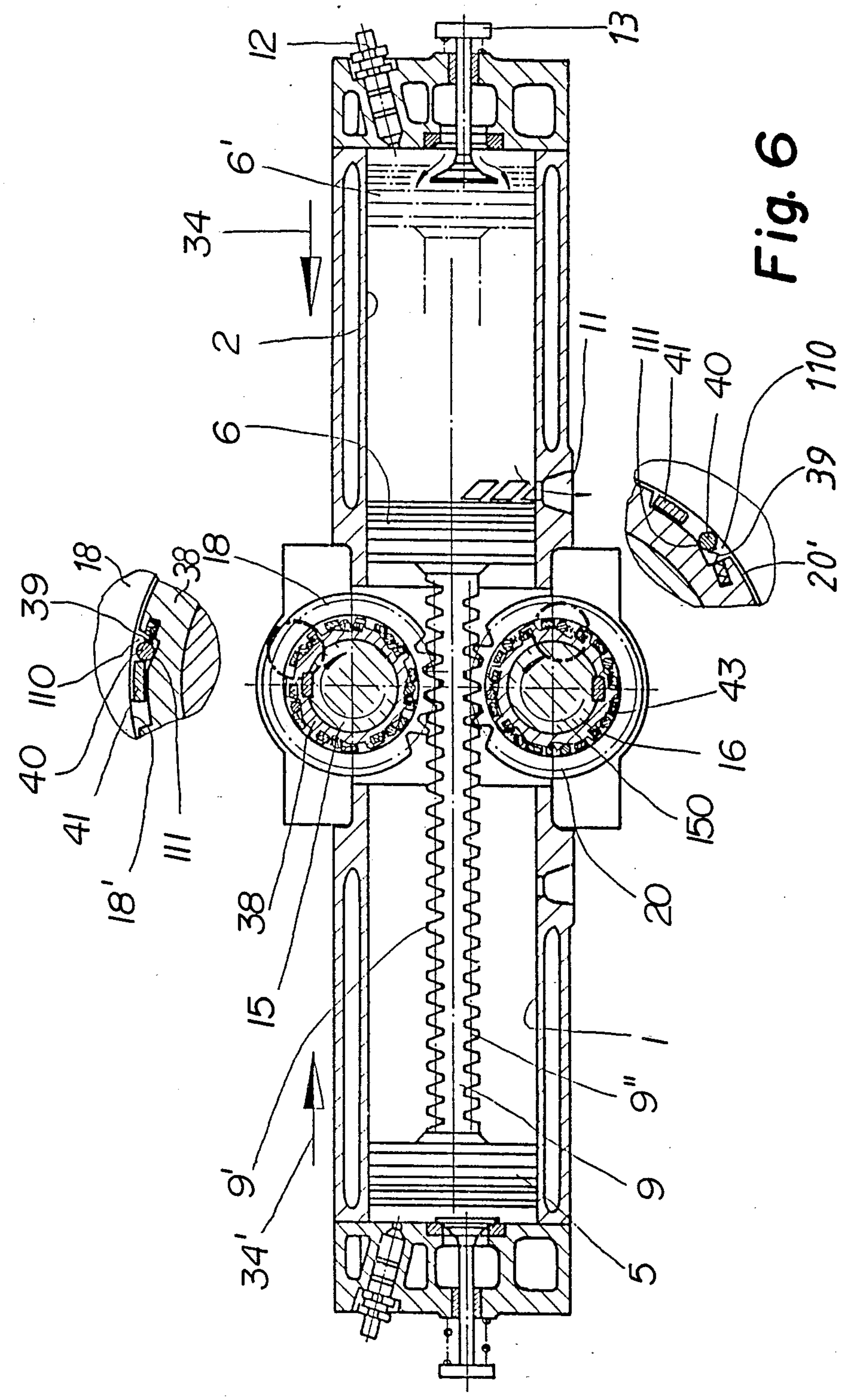
FIG. 6 is a section along the line VI—VI in FIG. 4*a*.

The drive of the gear wheel 18 is accomplished by means of the coupling shown in FIG. 6 between the gear wheel 18 and the shaft 15. This also is a grip roller and expanding friction clutch, formed by the grip roller bearing wheel 38 bearing wheel 38 with recesses 110, bottom surfaces 111, springs 39 and grip rollers 40. The grip roller and expanding friction clutch between gear wheel 18 and shaft 15 is modified with respect to the one in accordance with FIG. 5 in a manner known per se such that in the recesses 110 of the grip roller bearing wheel 38 there are additionally disposed bars 41 extending parallel to the wheel axis which, as shown in FIG. 4*a*, are an integral part of a disk 42 which is seated on the shaft 15 and is positively connected with the grip roller bearing wheel 38 by the permanent magnet 50. If the shaft 15 and the grip roller bearing wheel 38 with it rotate faster than the gear wheel 18, the frictional force between the bottom surface 111 of the recess 110 in the grip roller bearing wheel 38 pulls the grip roller 40 into the wedging position, thus making an interlocking and frictional coupling between the shaft 15 and the gear wheel 18. In this manner torque and with it kinetic energy is transferred from the shaft 15 to the gear wheel 18 and thus also to the gear rack 9. In this phase a driving of the gear rack 9 by means of the flywheel 25 takes place. The energy of the flywheel therefore is used to complete the stroke in the cylinder 1 during the compression phase. The same process takes place when starting.

In this phase the gear wheel 20 runs in the opposite direction from the shaft 16. The shaft 16 runs in the opposite direction from the gear wheel 20 because this opposite direction of rotation is the drive direction of rotation 150 of the shaft 16, i.e. that direction of rotation in which it is driven by the gear wheel 18 when the gear rack 9 moves to the left in the direction 34. Free-wheeling of the gear wheel 20 in the opposite direction of the drive direction of rotation 150 of the shafts 16 is made possible because, as illustrated, the bars 41 push the grip rollers 40 against the force of the springs 39 into a position where the inner surface 20' of the gear wheel 20 is out of engagement with the grip roller bearing wheel 43. Both at top and bottom dead center a switching cam 9''' extends into an associated switching cam 42' provided on the disk 42 (see FIG. 2) and moves it out of the grip position (FIG. 6, section at the bottom) into the free-wheeling position (FIG. 6, section at top) or vice versa.

If the direction of movement of the gear rack 9 is reversed, i.e. if it moves towards the right in FIGS. 5 and 6, the frictional force exerted by the inner surface 17' of the gear wheel 17 on the grip rollers 33 disengages free-wheeling between the grip roller bearing wheel 31 and the gear wheel 17 so that the shaft 15 rotates in the drive direction of rotation 150.

As soon as the speed of the gear wheel 19 reaches that of the shaft 16, seizing occurs between the gear wheel 19 and the grip roller bearing wheel 35 so that the shaft 16 is driven in the drive direction of rotation 150 by the gear rack 9.

When the movement of the gear rack 9 towards the right slows because the expansion phase in the piston 1 comes to an end and the compression phase in the cylinder 2 requires increased input of force, the shaft 16 with the grip roller bearing wheel 43 "overtakes" the gear wheel 20 so that now the grip rollers 40 seize between the inner surface 20' of the gear wheel 20 and the recess in the grip roller bearing wheel 43 and a drive of the gear rack 9 towards the right takes place via the fly wheel 25 and shaft 16.

During the movement towards the right of the gear rack 9 both gear wheels 17 and 18 free-wheel.

The identical actions as described above take place between the gear wheels 27, 28, 29, 30 and the shafts 15 or 16 on the one hand and the gear rack 10 on the other, the gear wheel 17 being equivalent to 27, 18 to 27, 19 to 30 and 20 to 29.

The gear wheels 17, 19 are wider because they are used to transfer the energy created during expansion to the gear rack and the flywheel. This energy is, in accordance with the nature of an internal combustion engine, very much higher than the energy required for compression, which is to be transferred by the somewhat narrower gear wheels 18, 27, 29, 20.

Assembly is accomplished as follows: First the gear racks 9, 10 with attached pistons 5, 6, 7, 8 are inserted into the housing 200. Then the support rings 51 are mounted on both sides of the housing. The components consisting of shaft 24 and flywheel 25 or shafts 124 and flywheel 26 are inserted. Then the shafts 15, 16 are inserted, on which the gear wheels 17, 18, 27, 28 and 21, 121 or 19, 20, 29, 30 and 22, 122 have previously been mounted.

It is to be understood that the above description of a preferred embodiment has been given by way of example only and that other variants and further improvements are possible within the scope of the invention.

What is claimed is:

1. A pinion gear assembly for translating reciprocating movements of the pistons in the cylinders of an internal combustion engine into the rotating movement of a drive shaft of the engine, comprising:

two gear racks, each gear rack having at its two ends a piston connected thereto, each piston being associated with a cylinder of the engine;

a pair of shafts;

two pairs of gears;

a grip roller and expanding friction clutch assembly associated with each gear of said pairs of gears for mounting the associated gear to a respective shaft, each pair of gears being thus mounted to mesh with a respective one of the gear racks;

two further pairs of gears; and a grip roller and expanding friction clutch assembly associated with each gear of said further pairs of gears for mounting the associated gear to a respective shaft, each further pair of gears being thus mounted to mesh with a respective one of the gear racks, such that:

in one direction of movement of each gear rack one gear of each pair of gears drives its associated shaft in a given direction, and in the opposite direction of movement of each gear rack the other gear of each pair of gears drives said associated shaft in said given direction; and said pair of shafts continuing to rotate in said given direction when each gear is rotated in a direction opposite to said given direction by its respective gear rack due to the grip roller and expanding friction clutch assembly associated with each gear;

said given direction being the same for each shaft which together serve to drive the drive shaft;

in said given direction, each shaft drives a gear of its associated further pair of gears and the gear rack meshing with said gear of its associated further pair of gears; and in the direction opposite to said given direction, said gear of its associated further pair of gears freewheels, and wherein:

each gear rack includes switching means, each grip roller and expanding friction clutch assembly includes: a grip roller bearing wheel fixedly mounted on its respective shaft, said grip roller bearing wheel having a plurality of recesses around its circumference each with a bottom surface, the distance of which from the inner surface of the gear wheel increasing in said given direction; a grip roller disposed in each recess; a spring in each recess for biasing the grip roller in its respective recess into a gripping position; a disc including a plurality of bars, one for each recess; and magnetic means for force-locking said disc, and each grip roller and expanding friction clutch assembly is switchable by said switching means.

2. The pinion gear assembly as defined in claim 1, wherein the switching means comprise switching cams which, in the end positions of the gear racks, pivot said disc thereby serving to switch from a free-wheeling condition to a gripping condition and vice versa.

* * * * *